(12) United States Patent
Brewer et al.

(10) Patent No.: US 6,643,448 B1
(45) Date of Patent: Nov. 4, 2003

(54) OPTICAL FIBER STRIPPING TOOL

(75) Inventors: Tracy Brewer, Hayward, CA (US);
Marlon Geronimo, Union City, CA (US); Charles Chan, Fremont, CA (US); Sam Chan, San Jose, CA (US)

(73) Assignee: Wavesplitter Technologies, Inc., Fremont, CA (US)

( * ) Notice: Subject to any disclaimer, the term of this patent is extended or adjusted under 35 U.S.C. 154(b) by 0 days.

(21) Appl. No.: 09/835,053

(22) Filed: Apr. 13, 2001

(51) Int. Cl.[7] .............................. G02B 6/00; H02G 1/12
(52) U.S. Cl. .................. 385/147; 81/9.41; 81/9.51; 30/90.1
(58) Field of Search .................. 385/147; 30/90.1, 30/90.4; 81/9.41, 9.42, 9.43, 9.51

(56) References Cited

U.S. PATENT DOCUMENTS

| | | | | |
|---|---|---|---|---|
| 4,616,533 A | * | 10/1986 | Wiener et al. ............... 81/9.41 |
| 4,869,412 A | * | 9/1989 | Bishop ....................... 226/170 |
| 4,945,788 A | * | 8/1990 | Matthews ..................... 81/9.4 |
| 4,969,703 A | * | 11/1990 | Fyfe et al. .................. 385/123 |
| 5,389,192 A | * | 2/1995 | Takimoto et al. ........... 156/584 |
| 6,079,297 A | * | 6/2000 | Chandler et al. ............. 81/9.51 |
| 6,164,163 A | * | 12/2000 | Lesueur et al. .............. 81/9.51 |
| 6,311,581 B1 | * | 11/2001 | Hsieh .......................... 81/9.51 |

OTHER PUBLICATIONS

"FO 103–S Miller Fiber Optic Stripper" printed from www.ripley–tools.com, Ripley Co. 1999, 1 pg.

* cited by examiner

*Primary Examiner*—Michael C. Zarroli
(74) *Attorney, Agent, or Firm*—Blakely, Sokoloff, Taylor & Zafman LLP (57) ABSTRACT

A method and apparatus is described for stripping the coating of an optical fiber. A fixture having a fiber cleat may be used to secure an optical fiber to enable removal of the protective coating from the fiber along a precise length of the fiber. The length of protective coating removal may be controlled by a strip guide. A stop coupled to the apparatus also controls how much of the coating is removed.

21 Claims, 10 Drawing Sheets

OPTICAL FIBER STRIPPING TOOL

FIELD OF THE INVENTION

This invention relates to the field of optical components and, in particular, to tools used in the manufacture of optical components.

BACKGROUND

Figure 1A:
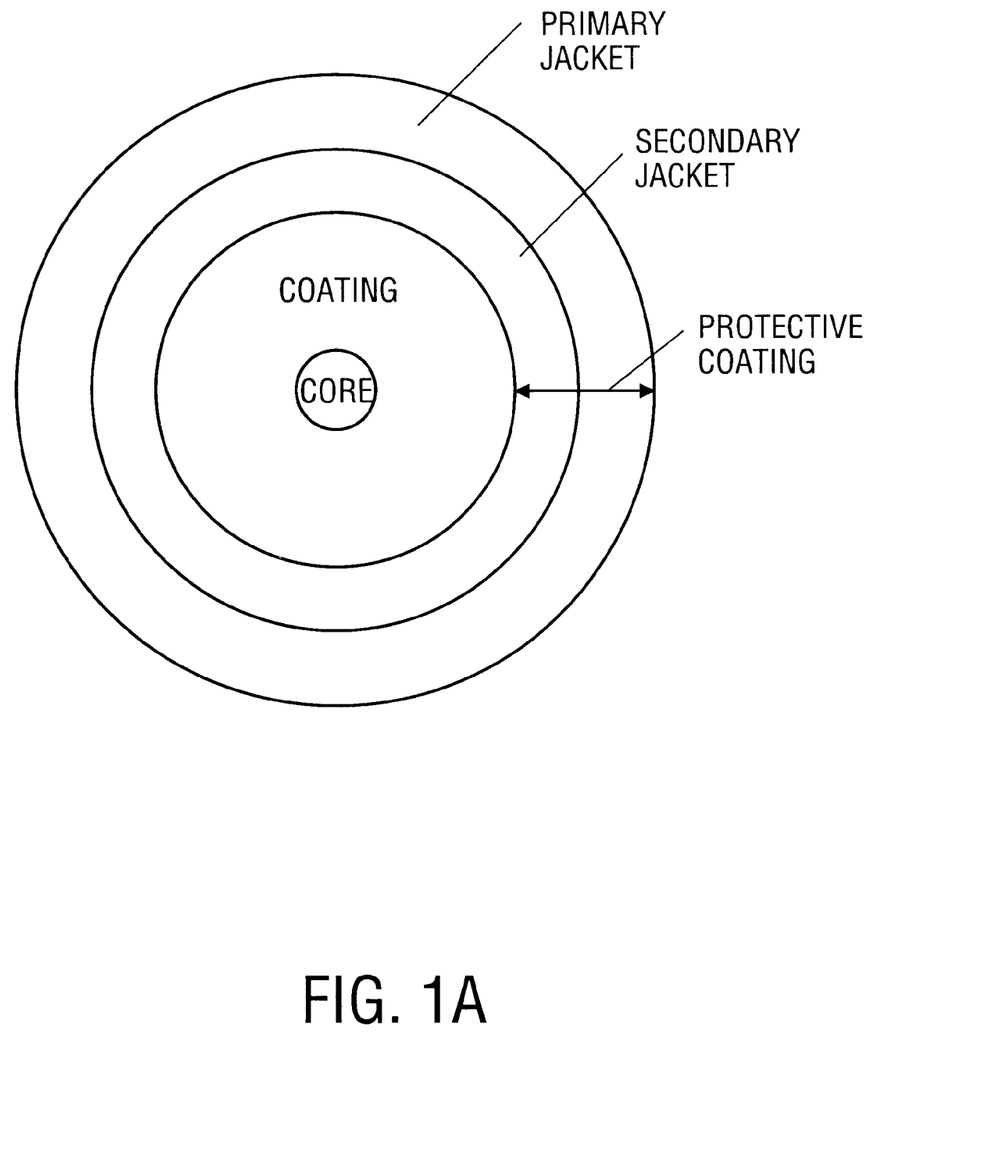
FIG. 1A illustrates one embodiment of an optical fiber.

Optical fibers are currently used in many applications such as broadband data communications. Data is transmitted by pulsing light waves through the optical fibers. Optical fibers typically consist of a core surrounded by a cladding, and one or more jackets that form a protective coating, as illustrated in FIG. 1A. The protective jackets are typically made of a plastic material, for example, UV curable acrylate. The protective coating may be removed when the fiber is connected to or incorporated into an optical component such as a fiber coupler. When manufacturing a fiber coupler, the protective coatings of two or more fibers are removed to expose a given length of their claddings. The exposed fiber claddings are then joined together to form the optical coupler.

As such, precise removal of the protective coatings is necessary to ensure that: the proper length of protective coating is removed; the protective coating along the desired length is completely removed; and that cladding material is not removed when the protective coating is stripped.

Figure 1B:
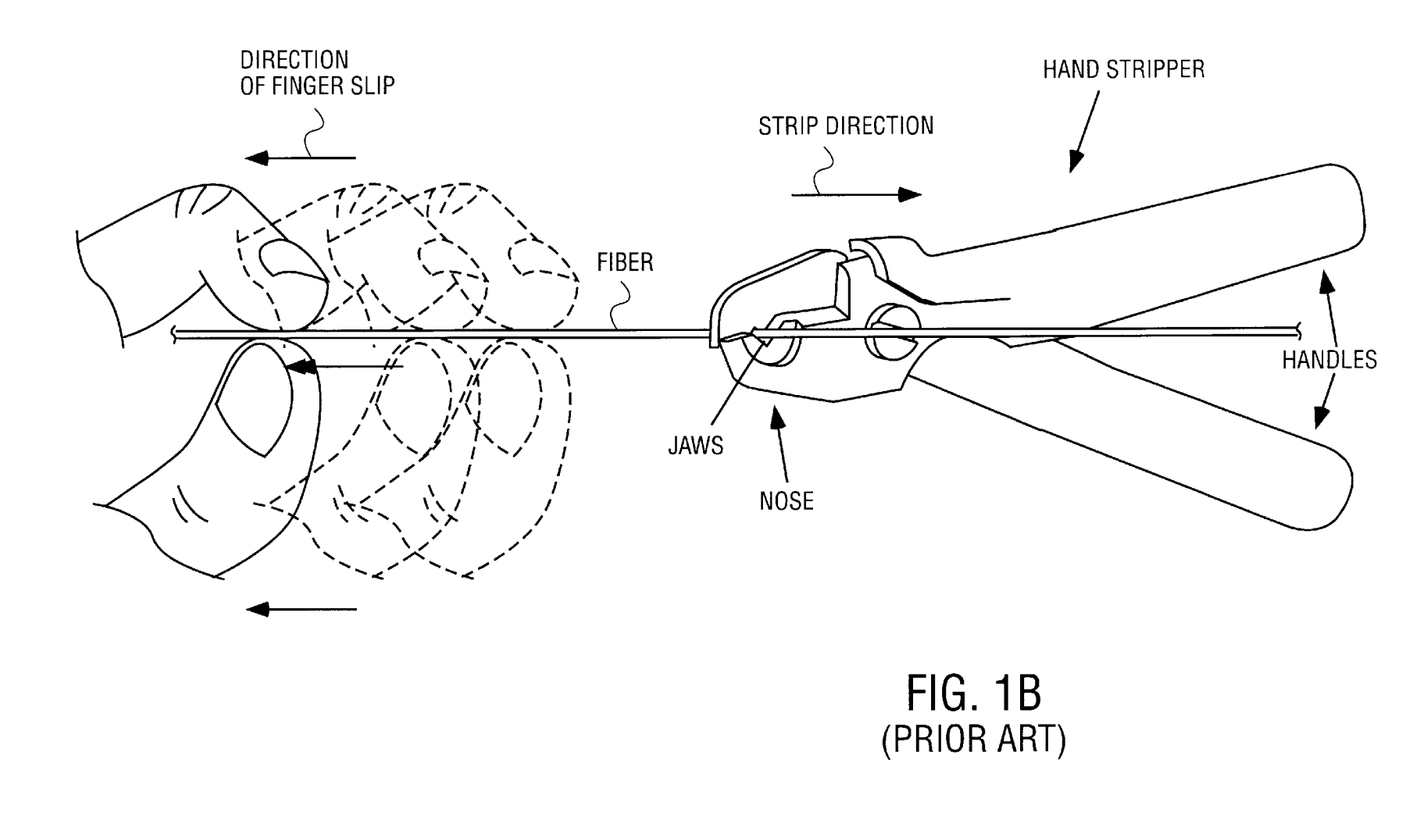
FIG. 1B illustrates a prior art method of stripping an optical fiber.

FIG. 1B illustrates one prior art method of removing the protective coating from an optical coupler. An operator grasps the optical fiber between their fingers of one hand, grasps the handles of a fiber stripper with the other hand, secures the fiber in the jaws of a hand stripper, squeezes the handles and then pulls the hand stripper along the desired length of coating removal. One problem with such a method is that the protective coating tends to be slick and, thus, slide through an operator's fingers when the hand strippers are pulled along the fiber. This may result in various problems, for examples: imprecise coating removal due to inaccurate strip lengths; insufficient penetration into the protective coating by the stripper blades; excessive penetration into the fiber resulting in undesired removal of the fiber cladding; and/or repeated attempts at coating removal.

Another prior art method for removing protective coatings involves the use of etching techniques. One problem with etching methods is that extensive chemical etching of the protective coating may weaken the fiber and introduce stress defects that affect signal propagation through the fiber. Another problem with chemical etching is that is takes a longer time to remove the protective coating than with mechanical techniques. Yet other problems with chemical etching are the increased manufacturing costs due to the cost of the chemical itself and the expense of handling a chemicals in a safe manner.

SUMMARY OF THE INVENTION

The present invention pertains to an optical fiber stripping tool and method of using same. The optical fiber stripping tool may include a body and a cleat coupled to the body to receive a fiber having a coating. The optical fiber stripping tool may also include a guide coupled to the body to receive a tool to remove the coating and a stop coupled to the body to control a length of coating removed from the fiber.

In one embodiment, the method may include securing a protective coating of a fiber against a surface having a high coefficient of friction and positioning a section of the protective coating along a rest having a guide. The guide having a length determined by a stop. The method may also include applying a blade to the protective coating of the fiber and moving the blade along the length to remove the protective coating.

In one embodiment, a fiber having an exposed section of cladding may be formed by securing the fiber against a cleat having a high coefficient of friction and removing a length of a fiber coating using a coating removal tool moved along a guide having a stop to determine the length.

Additional features and advantages of the present invention will be apparent from the accompanying drawings and from the detailed description that follows.

BRIEF DESCRIPTION OF THE DRAWINGS

The present invention is illustrated by way of example, and not by way of limitation, in the figures of the accompanying drawings and in which.

DETAILED DESCRIPTION

In the following description, numerous specific details are set forth such as examples of specific materials, components, dimensions, etc. in order to provide a thorough understanding of the present invention. It will be apparent, however, to one skilled in the art that these specific details need not be employed to practice the present invention. In other instances, well known materials or methods have not been described in detail in order to avoid unnecessarily obscuring the present invention.

A method and apparatus is described for stripping the protective coating from a material. In one embodiment, the apparatus may include a cleat, a guide, and a stop. The cleat may be used to secure the material to enable removal of a precise length of protective coating from the material along the guide. The length of the protective coating removed may be controlled by the stop.

In one embodiment, the apparatus may be a fiber stripping tool used to remove the protective coating from an optical fiber, for example, SMF 28 manufactured by Corning of Corning, N.Y. Optical fibers are known in the art; accordingly, a detailed discussion is not provided. In an alternative embodiment, the apparatus may be used to remove protective coatings from other types of materials, for example, wires.

Figure 2:
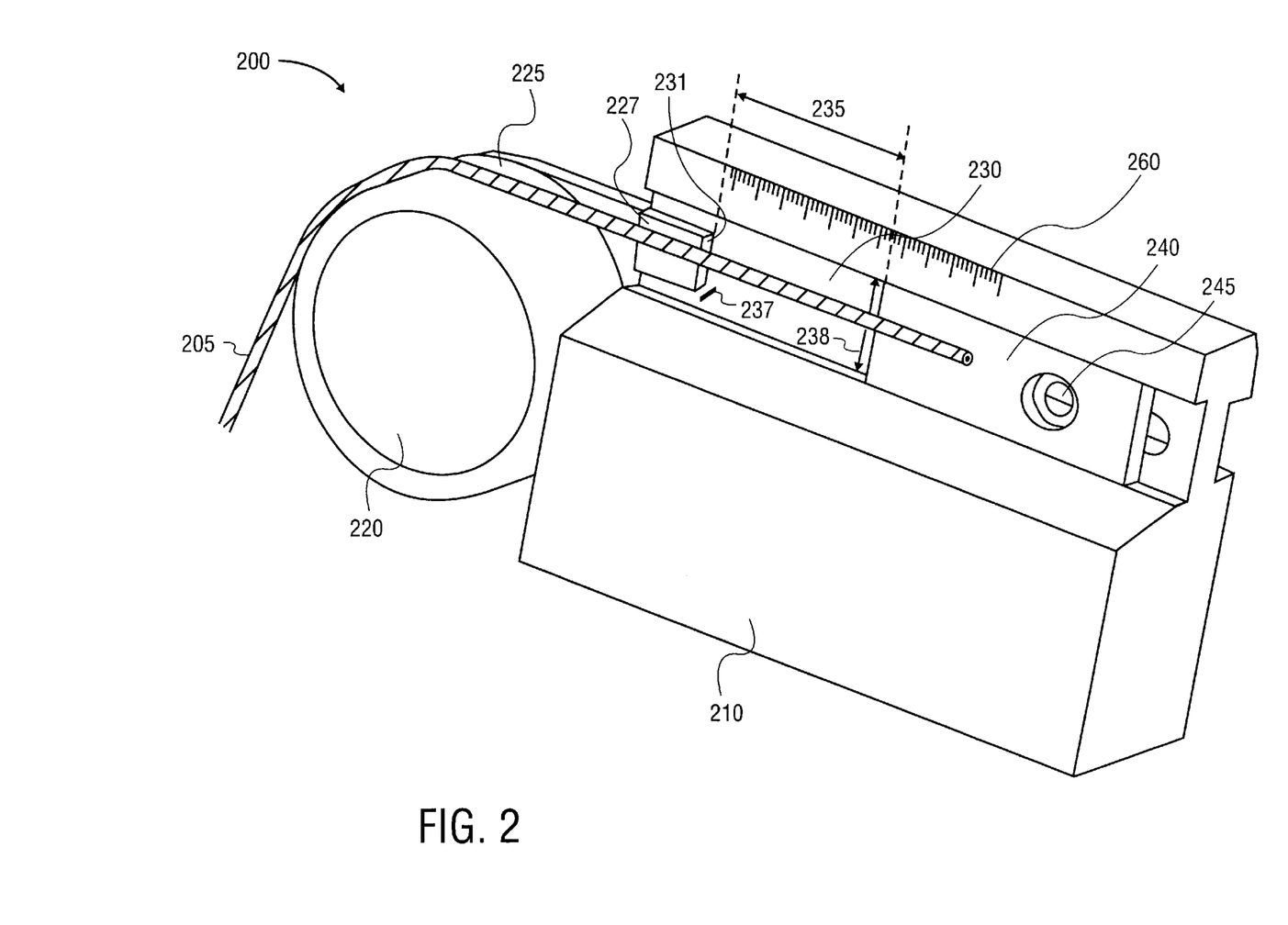
FIG. 2 illustrates one embodiment of a fiber stripping tool.

FIG. 2 illustrates one embodiment of a fiber stripping tool. In one embodiment, fiber stripping tool 200 includes body 210, cleat 220, stop 240, and guide 230. A fiber 205 have a protective coating may be secured around cleat 220 and along rest 227 as illustrated. In operation, one or more blades (not shown) may be pressed against fiber 205 and moved along guide 230 to strip the protective coating from fiber 205. In one embodiment, for example, the blades of a hand stripper may be clamped around fiber 205 starting at end 231 of blade guide 203 and pulled along guide 230 to stop 240. Alternatively, the blades may start at stop 240 and be pulled across guide 230 to end 231.

Hand strippers are available from industry manufacturers. In one embodiment, for example, a FO 103-S Miller Fiber Optic Stripper available from Ripley Company, CT may be used. Hand strippers are known in the art; accordingly, a detailed discussion is not provided herein. In an alternative embodiment, fiber stripping tool 200 may be used with other types of strippers, for example, a thermal stripper.

In one embodiment, cleat 220 may have an outer surface 225 constructed from a material to provide a low or non-slip interface with fiber 205. Alternatively, the entire cleat 220 may be constructed from the material used for surface 225. In one embodiment, for example, surface 225 is constructed from rubber. In an alternative embodiment, other materials having high coefficient of static friction may be used, for example, vinyl.

In one embodiment, cleat 220 may have a wheel shape for ease of securing fiber 205 with the fingers of an operator's hand. In alternative embodiments, cleat 220 may have other shapes, for example, rectangular.

Guide 230 may be formed by a channel recessed within rest 227. Guide 230 may have a height 238 and a depth 237 configured to receive a blade. The position of stop 240 is adjustable along guide 230 and may be set within channel 230 to provide any given channel gap length 235 along which a blade may move to strip fiber 205. A scale 260 may be positioned along the side of guide 230 to calibrate the movement of stop 240 to enable precise adjustment of stop 240. In an alternative embodiment, scale 260 may be positioned in other places, for example, within the channel of guide 230.

Figure 3:
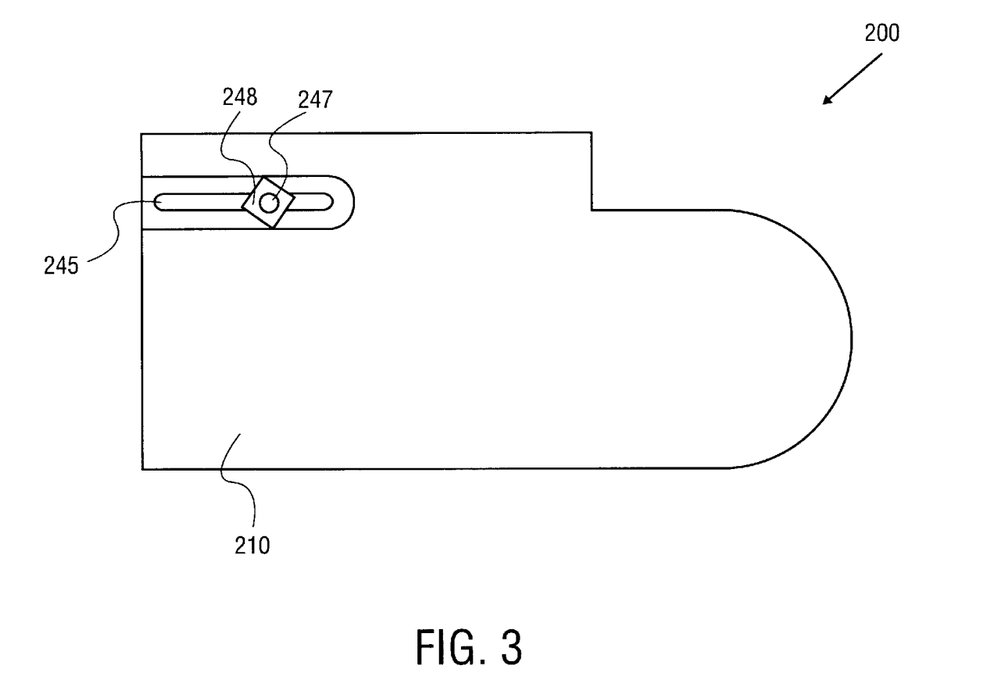
FIG. 3 illustrates a back side view of a fiber stripping tool of FIG. 2.

In one embodiment, stop 240 may be set within guide 230 by passing a bolt 247 through opening 245 and tightening bolt 247 with nut 248, as illustrated in FIG. 3. In an alternative embodiment, other stop securing mechanisms may be used, for examples, a clamp and a rack and pinion assembly. The body 210 may be mounted to a table, wall, or other fixed structure to obviate holding during operation of tool 200.

Figure 7:
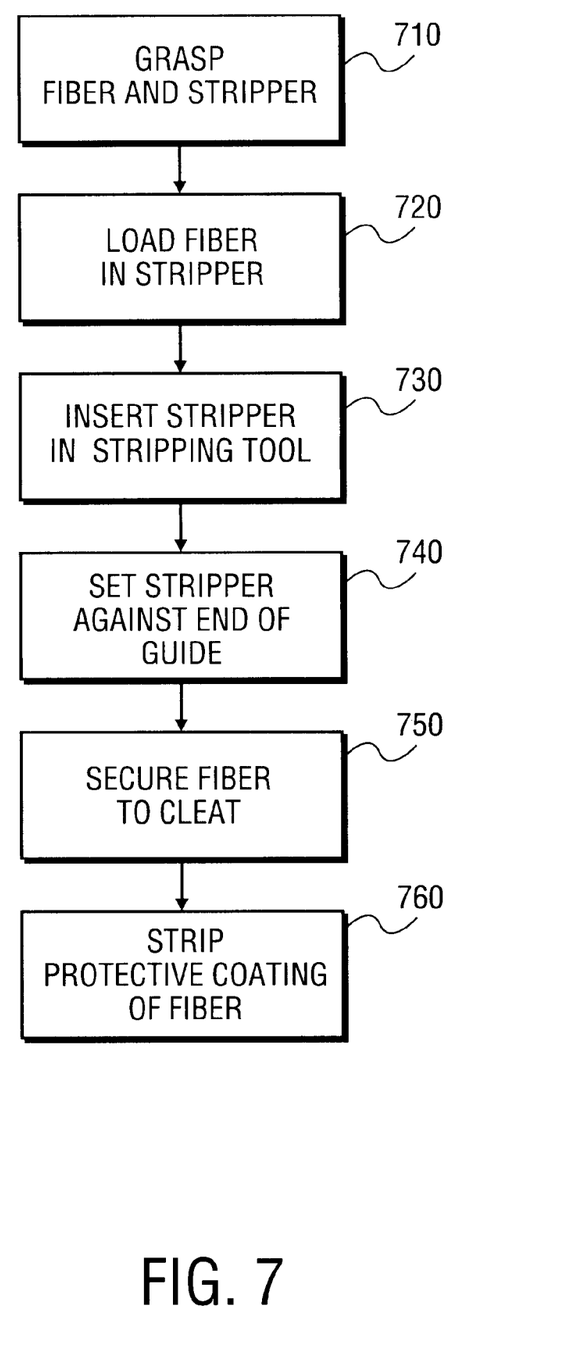
FIG. 7 illustrates an exemplary embodiment of a method of using a fiber stripping tool.

FIG. 7 illustrates an exemplary embodiment of a method of using fiber stripping tool 200. In one embodiment, fiber stripping tool 200 may be mounted on a surface, for example, a table above the legs of a seated operator. Alternatively, fiber stripping tool 200 may be mounted in other relationships to an operator. Fiber 205 may be grasped by the operator's fingers of one hand, while the other hand grasps a stripper, step 710. The stripper may be, for example, a hand stripper such as that illustrated in FIG. 1B. Fiber 205 may then be loaded into the jaws of the stripper, step 720.

Figure 8A:
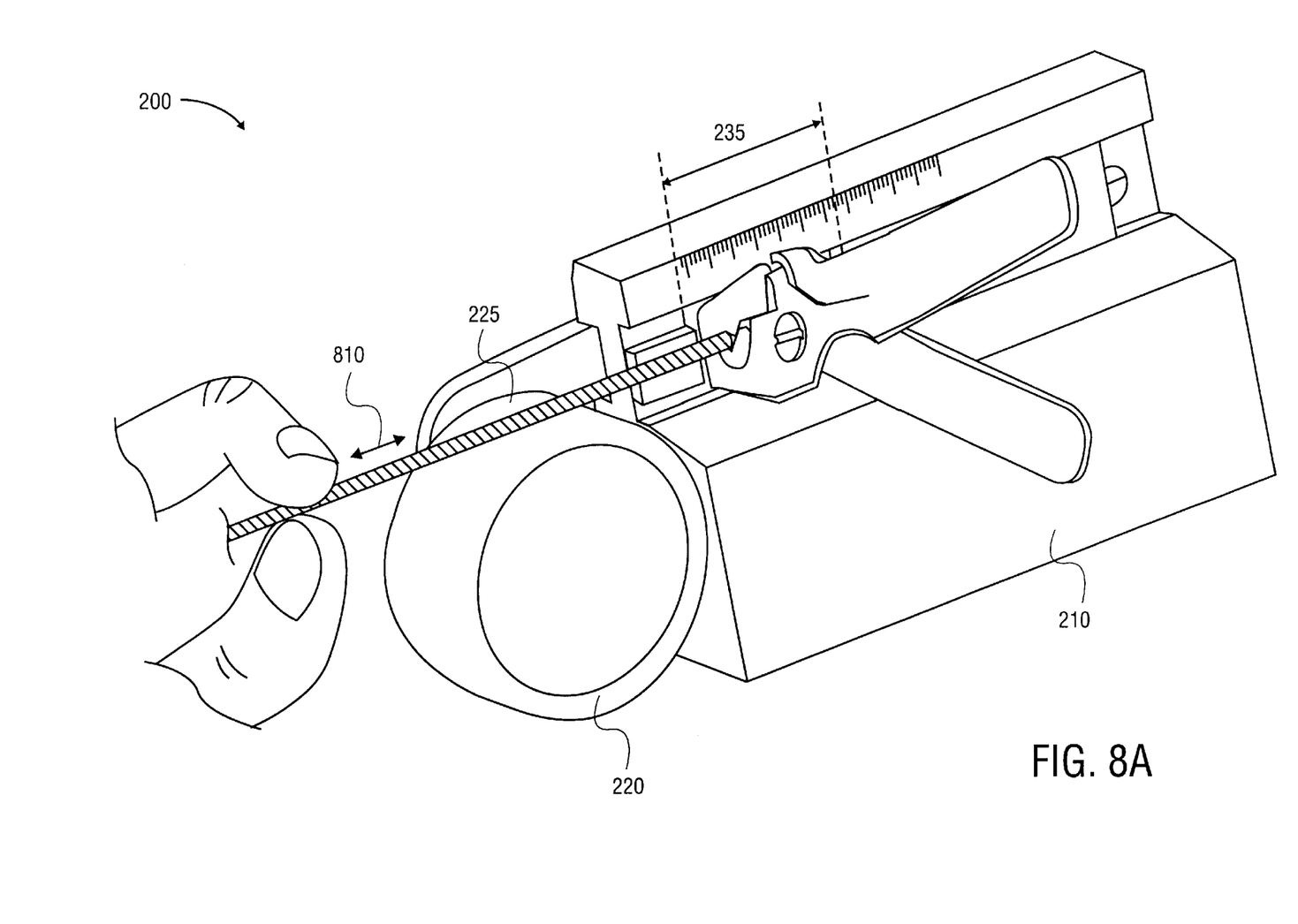
FIG. 8A illustrates a first tension applied to a fiber.

The handles of the hand stripper may initially be squeezed without pulling on fiber 205. The nose of hand stripper is inserted into guide 230 of fiber stripping tool 200, step 730. With the operator's fingers still grasping fiber 205, the operator may gently pull fiber 205 with the other hand across guide 230 until the hand stripper comes into contact with end 231 of fiber stripping tool 200, step 740, as illustrated in FIG. 8A. This may be done using slight tension 810, for example, approximately half the tension 820 of FIG. 8B required to strip a piece fiber 205 with minimal or no protective coating stripped from fiber 205 at this point.

Figure 8B:
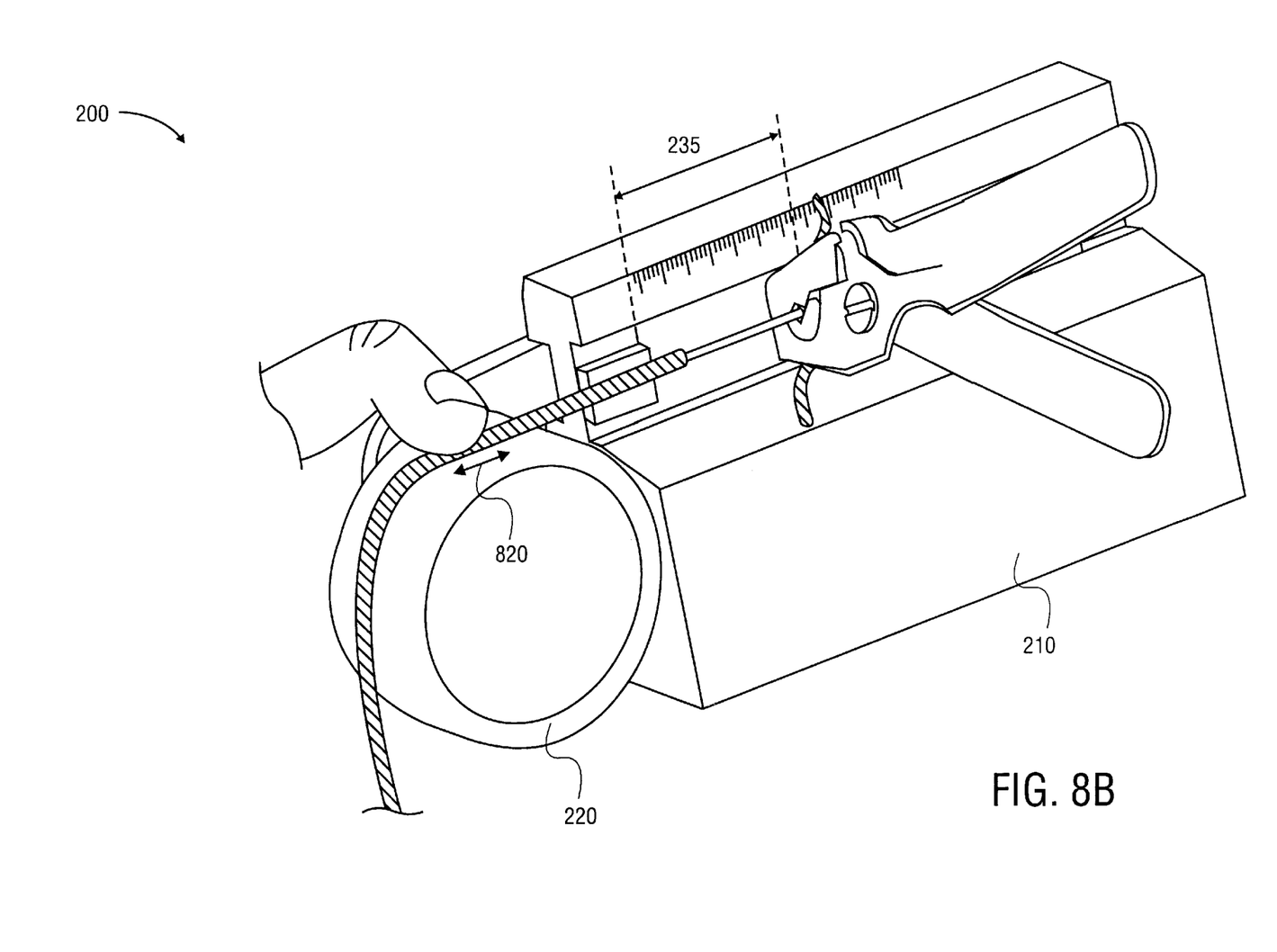
FIG. 8B illustrates a second tension applied to a fiber.

Fiber 205 may be wrapped over cleat 220 of fiber stripping tool 200 so that a portion (e.g., a quarter) of the cleat perimeter is in contact with fiber 205 while maintaining slight tension, step 750. The stripper is moved across guide 230 with a higher tension on fiber 205 until the stripper contacts stop 240 as illustrated in FIG. 8B, thereby stripping the protective coating of fiber 205, step 760. The stripper may then be removed from fiber stripping tool 200. The setting of the fiber and hand stripper against end 231 using only slight tension 810 in step 740 allows for a more accurate strip of the protective coating of fiber 205.

Figure 4:
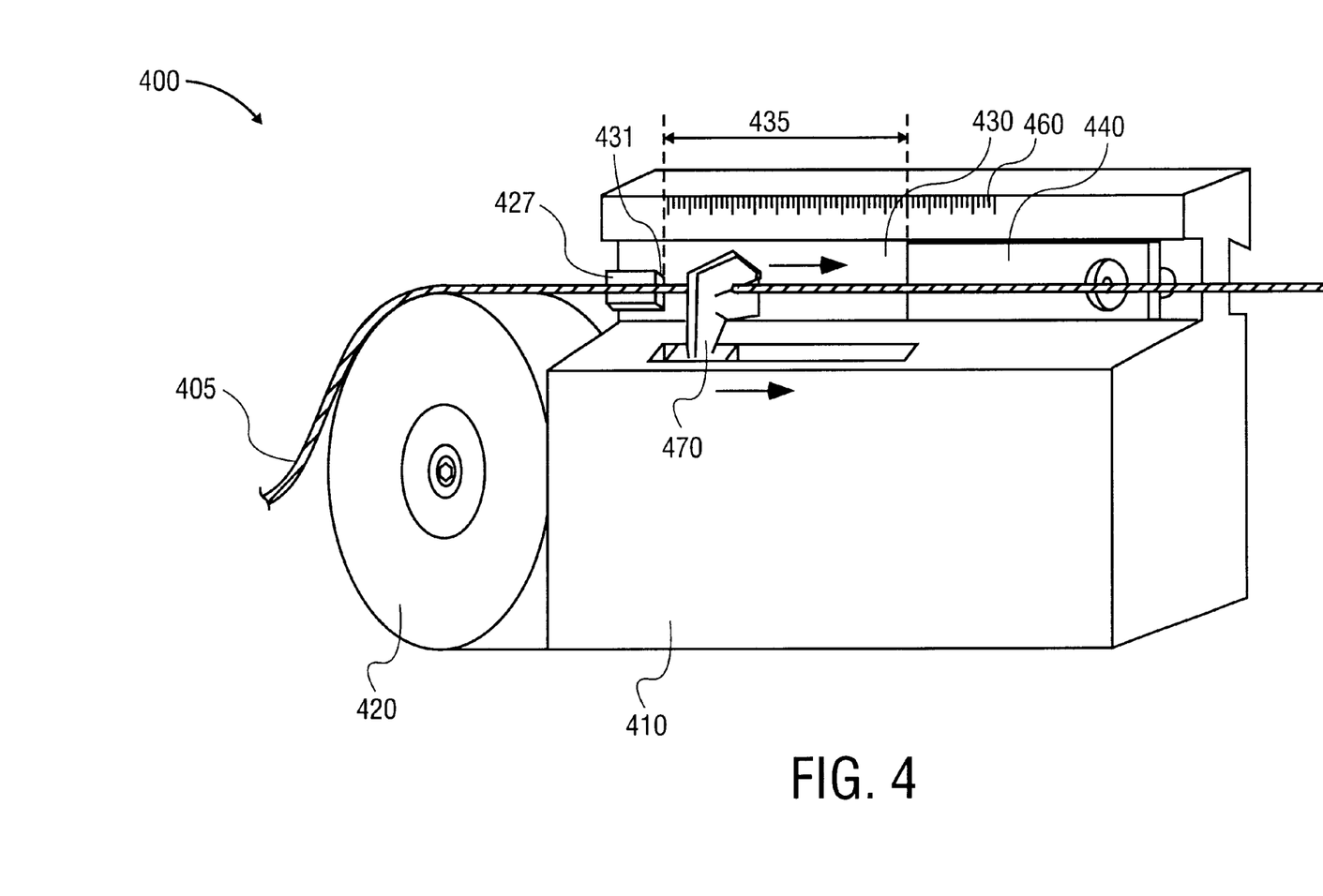
FIG. 4 illustrates an alternative embodiment of a fiber stripping tool.

FIG. 4 illustrates an alternative embodiment of a fiber stripping tool. In one embodiment, fiber stripping tool 400 includes body 410, cleat 420, stop 440, guide 430, a blade 470. A fiber 405 have a protective coating may be secured around cleat 420 and along rest 427 as illustrated. Blade 470 is coupled to body 410. Blade 470 represents a blade or a pair of blades that may be pressed against fiber 405 and moved along guide 430 to strip the protective coating from fiber 405. In one embodiment, for example, blade 470 may be starting at end 431 of blade guide 430 and pulled along guide 430 to stop 440. Alternatively, blade 470 may start at stop 440 and be pulled across guide 430 to end 431. In an alternative embodiment, a blade may be incorporated into other location of fiber stripping tool 400. For example, a blade may be incorporated into the end or backside of stop 440 with stop 440 configured so that it may slide across guide 430 to end 431, thereby stripping the protective coating from fiber 405.

Cleat 420 may be similar to cleat 240 discussed above in relation to FIG. 2. Guide 430 may be formed by a channel recessed within rest 427. Guide 430 may have a height 438 and a depth 437 configured to receive blade 470. The position of stop 440 is adjustable along guide 430 and may be set within channel 430 to provide any given channel gap length 435 along which blade 470 may move to strip fiber 405. A scale 460 may be positioned along the side of guide 430 to calibrate the movement of stop 440 to enable precise adjustment of stop 440. In an alternative embodiment, scale 460 may be positioned in other places, for example, within the channel of guide 430.

Figure 5:
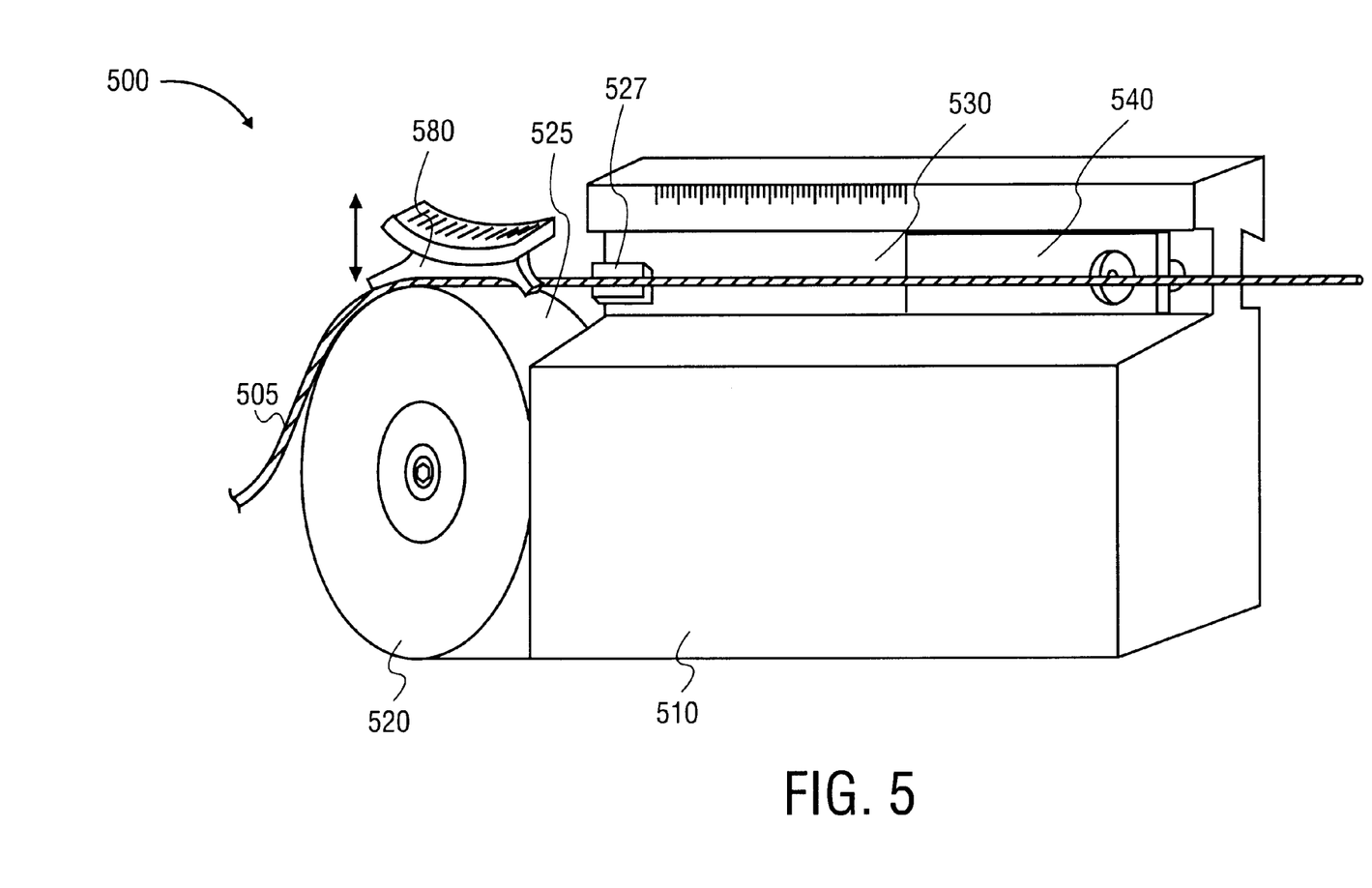
FIG. 5 illustrates yet another embodiment of a fiber stripping tool.

FIG. 5 illustrates yet another embodiment of a fiber stripping tool. In one embodiment, fiber stripping tool 500 includes body 510, cleat 520, stop 540, guide 530, and a clamp 580. A fiber 505 have a protective coating may be secured around cleat 520 and along rest 527 as illustrated. Clamp 580 may be used to secure fiber 505 to cleat 520. In operation, one or more blades, for example, blade 470 of FIG. 4 or the blades of a hand stripper may be pressed against fiber 505 and moved along guide 530 to strip the protective coating from fiber 505. Clamp 580 operates to inhibit the movement of fiber 505 while the protective coating is removed from fiber 505.

In one embodiment, cleat 520 and clamp 580 may each have outer surfaces (e.g., outer surface 525 of cleat 520) constructed from a material to provide a low or non-slip interface with fiber 505. Alternatively, the entire cleat 520 and/or claim 580 may be constructed from the material used for surface 525. In one embodiment, for example, the outer surfaces of one or both of cleat 520 and clamp 580 may be constructed from rubber. In an alternative embodiment, other materials having high coefficient of static friction may be used, for example, vinyl. Cleat 520 and clamp 580 may have various shapes for securing fiber 505.

Figure 6:
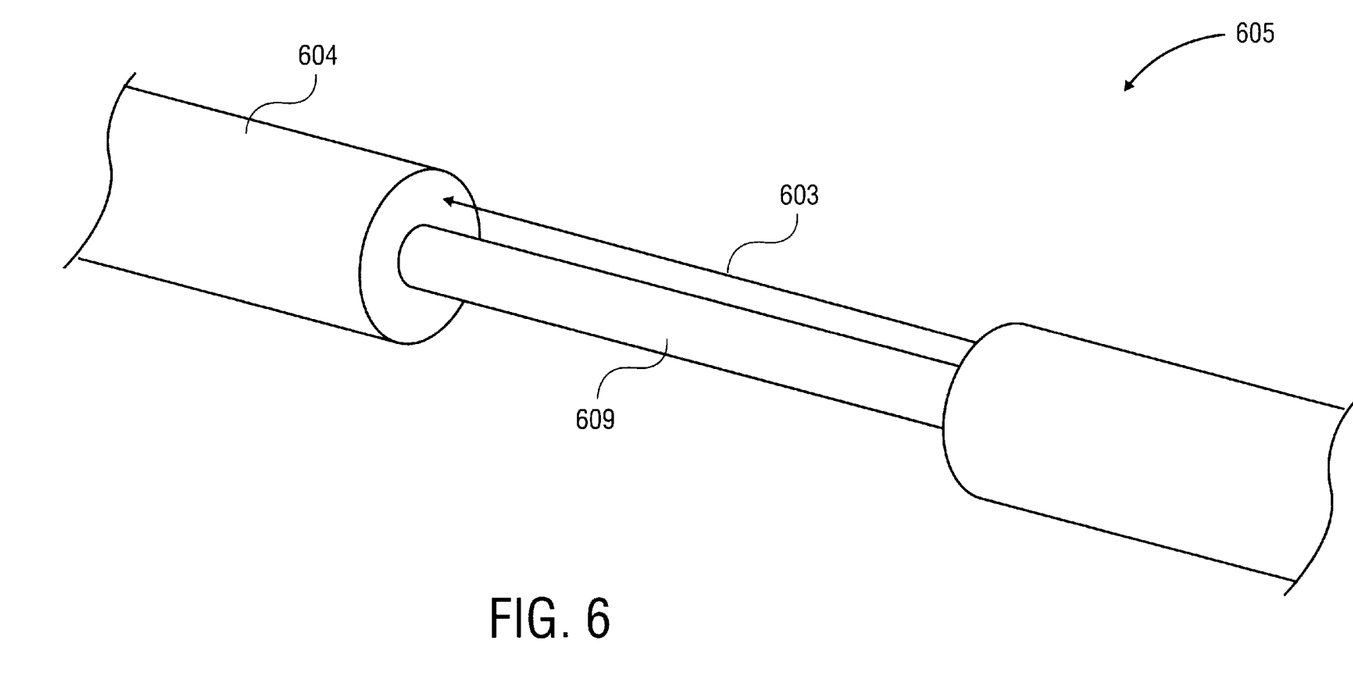
FIG. 6 illustrates a fiber section having its protective coating stripped using an embodiment of a fiber stripping tool.

FIG. 6 illustrates a fiber section having its protective coating stripped using an embodiment of a fiber stripping tool. The fiber stripping tools discussed above in relation to FIGS. 2–4 may be used to strip the protective coating 604 along a mid-span 603 of a fiber 605, for example, over a length of 25 millimeters (mm) to expose the cladding 609 underneath. The exposed claddings of two such fibers may be then be fused together to form an optical coupler. In an alternative embodiment, the protective coating from an end of fiber 605 may removed to facilitate the fiber's insertion to an optical component.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. An apparatus, comprising:
   a body;
   a cleat coupled to the body to receive a fiber having a coating;
   a guide coupled to the body to receive a tool to remove the coating; and
   a stop coupled to the body to control a length of coating removed from the fiber, wherein the cleat has a surface constructed from a low slip material, and wherein the low slip material is rubber.

2. The apparatus of claim 1, further comprising a securing mechanism coupled to the stop.

3. The apparatus of claim 2, wherein the securing mechanism comprises a nut and a bolt.

4. The apparatus of claim 2, wherein the securing mechanism comprises a rack and pinion assembly.

5. An apparatus, comprising:
   a body;
   a cleat coupled to the body to receive a fiber having a coating;
   a guide coupled to the body to receive a tool to remove the coating; and
   a stop coupled to the body to control a length of coating removed from the fiber, wherein the stop is adjustable along the guide.

6. The apparatus of claim 5, wherein the cleat has a surface constructed from a material having a high coefficient of static friction.

7. The apparatus of claim 5, further comprising a scale coupled to the body.

8. An apparatus, comprising:
   a body;
   a cleat coupled to the body to receive a fiber having a coating;
   a guide coupled to the body to receive a tool to remove the coating; and
   a stop coupled to the body to control a length of coating removed from the fiber, further comprising a clamp to secure the fiber to the cleat.

9. The apparatus of claim 8, wherein the guide has a length adjustable by the stop.

10. The apparatus of claim 9, wherein the tool is a blade and wherein the apparatus further comprises the blade coupled to the body to travel along the length of the guide.

11. An apparatus, comprising:
    means for receiving a tool to remove a coating of a fiber along a given length of the fiber; and
    means for securing the fiber against movement, using a surface having a high coefficient of friction, relative to the means for removing, wherein the means for securing comprises a rest having a guide, the guide having a length determined by a stop.

12. The apparatus of claim 11, further comprising means for adjusting the length.

13. The apparatus of claim 12, further comprising means for calibrating the means for adjusting.

14. The apparatus of claim 11, further comprising means for removing the coating of the fiber.

15. A method, comprising:
    securing a protective coating of a fiber against a surface having a high coefficient of friction;
    positioning a section of the protective coating along a rest having a guide, the guide having a length determined by a stop;
    adjusting the stop along the length of the guide;
    applying a blade to the protective coating of the fiber; and
    moving the blade along the length to remove the protective coating.

16. The method of claim 15, wherein the surface is constructed of rubber.

17. A method, comprising:
    securing a protective coating of a fiber against a surface having a high coefficient of friction, wherein securing comprises clamping the protective coating;
    positioning a section of the protective coating along a rest having a guide, the guide having a length determined by a stop;
    applying a blade to the protective coating of the fiber; and
    moving the blade along the length to remove the protective coating.

18. A method comprising:
    placing a fiber against a blade of a stripper;
    inserting the stripper into a guide of a fiber stripping tool;
    applying a first tension to the fiber;
    pulling the fiber to bring the stripper in contact with a stop, the stop disposed at one end of the guide;
    securing the fiber against movement while maintaining the first tension;
    applying a second tension to the fiber greater than the first tension; and
    moving the stripper along the guide away from the one end to remove a protective coating from the fiber.

19. The method of claim 18, wherein the first tension is approximately half the second tension.

20. The method of claim 18, further comprising mounting the fiber stripping tool to a fixed structure prior to inserting the stripper into the guide of the fiber stripping tool.

21. The method of claim 18, wherein securing the fiber comprises wrapping the fiber around approximately a quarter of a cleat of the fiber stripping tool.

* * * * *